US006794021B2

(12) United States Patent
Bader

(10) Patent No.: US 6,794,021 B2
(45) Date of Patent: Sep. 21, 2004

(54) MULTI-LAYER HERMETICALLY SEALABLE FILM

(75) Inventor: Michael J. Bader, Fairport, NY (US)

(73) Assignee: Exxon Mobil Oil Corporation, Irving, TX (US)

(*) Notice: Subject to any disclaimer, the term of this patent is extended or adjusted under 35 U.S.C. 154(b) by 98 days.

(21) Appl. No.: 10/079,685

(22) Filed: Feb. 20, 2002

(65) Prior Publication Data

US 2002/0160169 A1 Oct. 31, 2002

Related U.S. Application Data

(63) Continuation-in-part of application No. 09/791,347, filed on Feb. 23, 2001, now abandoned.

(51) Int. Cl.$^7$ .......................... B32B 15/08; B32B 27/08; B32B 27/30; B32B 27/32; B32B 31/30
(52) U.S. Cl. .................. 428/215; 428/212; 428/213; 428/214; 428/332; 428/336; 428/339; 428/346; 428/347; 428/349; 428/355 EN; 428/355 AC; 428/461; 428/463; 428/500; 428/515; 428/516; 428/518; 428/520; 428/523; 428/910; 156/244.11; 156/244.24; 264/288.4; 264/289.3; 264/290.2
(58) Field of Search .................. 428/35.2, 35.3, 428/35.7, 35.8, 35.9, 36.6, 212, 213, 214, 215, 332, 334, 335, 336, 339, 346, 347, 349, 355 EN, 355 AC, 461, 463, 500, 515, 516, 518, 520, 523, 910, 36.7; 156/244.11, 244.24; 264/288.4, 289.3, 290.2

(56) References Cited

U.S. PATENT DOCUMENTS

| 3,202,528 | A | | 8/1965 | James | |
|---|---|---|---|---|---|
| 4,020,228 | A | | 4/1977 | Eastes | 428/347 |
| 4,121,956 | A | | 10/1978 | Sample | 156/80 |
| 4,218,510 | A | | 8/1980 | Willson | 428/349 |
| 4,292,882 | A | | 10/1981 | Clausen | 89/36 A |
| 4,389,450 | A | | 6/1983 | Schaefer et al. | 428/212 |
| 5,019,447 | A | * | 5/1991 | Keller | 428/327 |
| 5,049,436 | A | | 9/1991 | Morgan et al. | 428/213 |
| 5,376,437 | A | | 12/1994 | Kawakami et al. | 428/216 |
| 5,527,608 | A | | 6/1996 | Kemp-Patchett et al. | 428/349 |
| 5,728,767 | A | * | 3/1998 | Kanetou et al. | 524/504 |
| 5,888,648 | A | | 3/1999 | Donovan et al. | 428/349 |
| 5,929,128 | A | | 7/1999 | Whetten et al. | 521/85 |
| 6,013,353 | A | * | 1/2000 | Touhsaent | 428/203 |
| 6,058,680 | A | | 5/2000 | Meli et al. | 53/451 |
| 6,326,068 | B1 | | 12/2001 | Kong et al. | 428/35.2 |

FOREIGN PATENT DOCUMENTS

| EP | 865907 A2 | 9/1998 |
|---|---|---|
| WO | 96/38299 | 12/1996 |
| WO | 98/21274 | 5/1998 |
| WO | WO98/21274 | 5/1998 |
| WO | 98/49003 | 11/1998 |
| WO | 01/34390 | 5/2001 |
| WO | 02/09938 | 2/2002 |

\* cited by examiner

Primary Examiner—Vivian Chen
(74) Attorney, Agent, or Firm—Rick F. James

(57) ABSTRACT

A thermoplastic multi-layer film for forming hermetic seals on packages comprising layer A comprising polyethylene, layer B comprising polypropylene, layer C comprising a copolymer, and an adhesion promoting coating applied to layer C.

28 Claims, No Drawings

MULTI-LAYER HERMETICALLY SEALABLE FILM

RELATED APPLICATIONS

This application is a continuation-in-part of application Ser. No. 09/791,347, filed Feb. 23, 2001, abandoned, entitled "Multi-Layer Hermetically Sealable Film," the entire disclosure of which is hereby incorporated herein by reference.

BACKGROUND OF THE INVENTION

1. Field of the Invention

The present invention relates to the art of packaging using multi-layer films, and, in particular, to a new composite multi-layer film for providing hermetic seals to multi-layer film packages.

2. Description of the Prior Art

Packaging technology has over the years required the development of many disciplines. Currently, packaging technologies integrate elements of engineering, chemistry, food science, metallurgy, and other technologies in order to provide the consumer fresh food product. In those cases where packages are prepared from multi-layer film, it is desirable to be able to provide a hermetic seal, i.e., a seal which does not permit passage of gas such as air.

In recent years, containers produced out of multiple-layer flexible film, such as bags and pouches, predominate the marketplace. In order to utilize continuous multiple-layer flexible film, the industry generally employs form/fill/seal packaging techniques. The type of product packaged dictates whether or not the technique will include horizontal form/fill/seal packaging (HFFS) or vertical form/fill/seal packaging (VFFS).

It is important for the packaging artisan to be able to select a multi-layer film having optimum barrier properties for storage of the food items and be confident of providing a high quality seal using high speed packaging apparatus. For example, it is known that stereoregular polypropylene, e.g., oriented polypropylene, is quite useful in the manufacture of packages from flexible films. Using oriented polypropylene as a core layer, additional layers in the way of coatings, co-extrusions, laminations, and combinations thereof are added to improve barrier properties of the film. In certain cases, films can be prepared which exclude moisture and oxygen, but permit the passage of light. In other cases, it is also important to prevent light from passing through the film barrier. Barrier properties can also be modified and/or enhanced by treatments such as heat and flame treatment, electrostatic discharge, chemical treatments, halogen treatment, ultraviolet light, and combinations thereof.

A primary concern for designing multiple-layer films for packaging is to ensure they can be processed on high speed form/fill seal machinery. Form/fill/seal package apparatus operates by unwinding continuous film from bulk film rolls, followed by forming pouches therefrom, filling the pouches, and finally, sealing the pouch closed. Thus, the film must have sufficient flexibility to undergo machine folding from a flat orientation to a folded condition, and be subjected to a sealing function which is part of high-speed packaging apparatus. In selecting the optimum multi-layer film for its barrier properties, high-speed unrolling and folding are the primary concern. An additional, and very important aspect of the packaging process, however, is the ability to effectively seal the pouch after it is filled with the product.

High-speed horizontal and vertical form/fill/seal apparatus include sealing functions at various stages of the packaging process. In a horizontal form/fill/seal apparatus, individual pouches are formed by folding the multi-layer film in half followed by providing vertical seals along the length of the folded web and separating the pouches along the seals formed by vertical sealing. (Optionally, the bottoms of the pouches can also be sealed). After the pouch thusly formed is filled, the top of the pouch is sealed.

Similarly, in vertical form/fill/seal apparatus, the continuous web is formed around a tube and the web is immediately joined together by a longitudinal sealing jaw as either a lap seal or a fin seal. Lap seals and fin seals are depicted in U.S. Pat. Nos. 5,888,648, 5,888,648 is incorporated herein by reference in its entirety.

A second sealing function is present in a VFFS configuration which consists of a combination top- and bottom-sealing section (with a bag cut-off device in between). The top-sealing portion seals the bottom of an empty bag suspended from the bag forming tube while the bottom portion seals the top of a filled bag.

In order, therefore, to provide high-barrier multi-layer film with hermetic seals, several factors must be considered. It is important to provide a sealing capability at as low a temperature as possible in order to retain, among other things, stereoregularity imposed during orientation, little or no film shrinkage, retention of film and/or chemical additive properties, and highly consistent quality sealing capabilities. Furthermore, the film must have surface characteristics which permit it to be readily used on high-speed machinery. For example, the coefficient of friction must be such that it can be readily unrolled from a high volume roll of film and passed through the packaging machinery. Undesirable sticking or friction characteristics can cause bag imperfections and interruption of high-speed processing. Moreover, seals formed during process must have good seal strength.

More recently, the packaging artisan has been concerned with the ability to provide quality seals which preserve the freshness of the contents while providing the consumer with an easily openable and reclosable container. Innovations to date have been primarily concerned with the components of the seal material.

U.S. Pat. No. 3,202,528 describes an oriented polypropylene film having an adherent heat-sealable coating which includes a material from the group consisting of copolymers of vinylidene chloride and acrylonitrile, copolymers of vinyl chloride with vinyl acetate, chlorinated rubbers, nitrocellulose and polyamide which melts below 160° C. and an acidic material provided in an amount of about 20 to about 60% by weight of the film forming material. This adhesive is coated and dried on the film. U.S. Pat. No. 3,202,528 is incorporated herein by reference in its entirety.

U.S. Pat. No. 4,020,228 describes a gel composition which provides a heat sealable surface to polyolefinic materials or cellulosic sheet materials. U.S. Pat. No. 4,121,956 discloses an ionomer adhesive adhered to an outer ionomeric surface of package wrapping for attachment of labels. U.S. Pat. No. 4,020,228 is incorporated herein by reference in its entirety.

U.S. Pat. No. 4,218,510 discloses a heat-sealable multi-layer film having a polyester layer chemically interfacially bonded to a polyolefinic layer which contains 250 to 750 parts per million of a fatty acid amide. U.S. Pat. No. 4,218,510 is incorporated herein by reference in its entirety.

U.S. Pat. No. 4,292,882 discloses an oriented heat-sealable anti-static polypropylene film manufactured by applying to a surface of a base polypropylene film a heat-sealable olefinic polymer containing between 0.2 and 10% by weight of an anionic hydrocarbyl sulfonate. Andrews, et al. also provide that a slip agent can be incorporated for ease of handling. U.S. Pat. No. 4,292,882 is incorporated herein by reference in its entirety.

U.S. Pat. No. 4,389,450 describes a multi-layer packaging film in which the outer polymeric layers cooperate to provide a relatively constant coefficient of friction differential. This enhances the ability to use the film in high speed processing to form fin seal and lap seals. U.S. Pat. No. 4,389,450 is incorporated herein by reference in its entirety.

U.S. Pat. No. 5,049,436 discloses a multi-layer film which is hermetically heat sealable over a broad temperature range. This patent describes a heat-sealable layer which includes an ethylene-propylene copolymer and/or an ethylene-propylene-butene terpolymer with an inorganic anti-block agent and a fatty acid amide. U.S. Pat. No. 5,049,436 is incorporated herein by reference in its entirety.

U.S. Pat. 5,376,437 describes a three-layer, heat sealable film having a base layer of biaxially oriented, crystalline polypropylene, a cushion layer of an olefin polymer lower in melting point than the base layer, and a heat-sealable layer of an olefin polymer. The various layers of this film have particular degrees of surface orientation. U.S. Pat. No. 5,376,437 is incorporated herein by reference in its entirety.

U.S. Pat. No. 5,527,608 describes a biaxially oriented heat sealable multilayer film which has a core substrate of a polyolefin homopolymer. On one surface of the core substrate is a layer of a block copolymer of ethylene and propylene having a melt flow ratio (MFR) of 1 to 10. A high density polyethylene layer may be placed on the other surface of the core substrate, and a heat sealable layer may be placed over the block copolymer layer. The heat sealable layer may be formed from a terpolymer of ethylene, propylene and butene-1, a random copolymer of ethylene and propylene, a random copolymer of propylene and butene-1 or blends thereof. U.S. Pat. No. 5,527,608 is incorporated herein by reference in its entirety.

U.S. Pat. No. 5,888,648 describes a multi-layer, hermetically sealable film. The main film substrate may be oriented polypropylene, optionally having a layer of high density polyethylene on one surface of the polypropylene. On the surface of the polypropylene opposite the high density polyethylene layer is an intermediate layer of polyethylene homo-, co- and terpolymers, amorphous nylon, ionomers or mixtures thereof. A preferred polymer in the intermediate layer is low density polyethylene. On the exterior surface of the intermediate layer is a sealing layer of, e.g., polyethylene homo-, co- and terpolymers, amorphous nylon, ionomers or mixtures thereof. U.S. Pat. No. 5,888,648 is incorporated herein by reference in its entirety.

U.S. Pat. No. 6,058,680 describes an apparatus and method for forming a hermetically sealed package for a slice of a food item. A web of thermoplastic material is first formed into a tubular arrangement with a hermetic longitudinal seal. To form the tubular arrangement, means are provided for folding a continuous web of thermoplastic material into V-folded condition and for continuously forming a hermetic seal along the open longitudinal edge of the V-folded web. The hermetic seal is formed between the inner surfaces of the front and rear faces of the web to define a tubular web member. The food item which has been formed into a soft mass, is then inserted into the tubular member and the tubular member is flattened to form a thin film tube. Means are provided for forming a hermetically sealed cross-seal which are disposed substantially transverse to the longitudinal forward moving direction of the web. U.S. Pat. No. 6,058,680 is incorporated herein by reference in its entirety.

Copending U.S. application Ser. No. 09/435,559 filed Nov. 8, 1999 to Kong et al discloses a multi-layer film having an improved composite structure for providing hermetic seals to packages manufactured in high speed packaging apparatus. The structure of the multi-layer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing, and sealing layer D has the primary function of providing adhesivity to the completed seal. The sealing layer D includes an antiblocking agent comprising non-distortable organic polymer particles having an average particle size greater than 6 microns. Copending U.S. application Ser. No. 09/435,559 is incorporated herein by reference in its entirety.

SUMMARY OF THE INVENTION

The present invention provides a thermoplastic multi-layer film for forming hermetic seals on packages comprising layer A comprising polyethylene, layer B comprising polypropylene, layer C comprising a copolymer, and an adhesion promoting coating applied to layer C.

DETAILED DESCRIPTION OF THE INVENTION

The present invention provides a multi-layer film and a method of improving multi-layer films whereby hermetic seals can be simply and efficiently formed and whereby excellent seat characteristics are achieved.

The present invention includes a core layer B of oriented polypropylene. It is noted that such a polypropylene layer B alone (without additional layers) characteristically has a stiffness or modulus which prevents or significantly reduces the ability to seal the film together where the film is bent to form overlaps or fins. In one embodiment the layered film has good barrier properties and can include a metallized film layer. For example, the layered film can include one or more additional layers selected from the group consisting of oriented polypropylene, ethylene-propylene copolymers, polyethylene terephthalate, polyamide, polyacrylonitrile copolymer, polyvinylidene chloride, fluoro-polymers, ethyl-vinyl alcohol copolymers, and mixtures thereof. Other layers can be barrier resins, tie resins, metallized film, ceramic deposited film (e.g., $SiO_4$), plasma chemical vapor deposited film, and metal, ceramic, plasma chemical vapor.

The layered film may be laminated through skin layer A to additional outer webs, such as oriented polypropylene (OPP), polyethylene terephthalate (PET), polyamide, polyethylene, and other mono- or multi-layer films. Layer A can also be metallized and then laminated, through the metal layer, to other films, such as a multi-layer biaxially oriented polypropylene film.

Layer C and the coating provide a sealing function and are bonded to layer B. These layers include a layer C, which is directly bonded to layer B, and a coating applied to the layer C.

In one embodiment, the C layer should has sufficient thickness and has sufficient flow property under sealing conditions to deform and comply with all unfilled space between the sealing jaws during sealing. The term "comply" means to be easily and inelastically forced to occupy all empty space remaining between sealing jaws while the sealing jaws are in the closed or seal position.

Polyethylene or polypropylene co- and terpolymers are contemplated for use in the layer C. The layer C material should flow under heat and pressure imposed by jaws of commercial sealing apparatus to occupy all the space between the jaws.

In another embodiment, the layer C may further comprise inorganic particles, such as solid oxides, having an average particle size greater than 2 microns. These inorganic particles of the layer C may be composed of silica ($SiO_2$), metal carbonates (including alkali metal carbonates, such as calcium carbonate), metal silicates (including alkali metal silicates, such as magnesium silicate, and other metal silicates, such as aluminum silicate), metal phosphates (including alkali metal phosphates, such as calcium phosphate), clays, talc, diatomaceous earth, glass and the like. Examples of inorganic blocking materials include the Syloids, available from W. R. Grace Davison Division, synthetic amorphous silica gels having a composition of about 99.7% $SiO_2$ and a particle size of about 2–4 microns, particularly Syloid 244, having a particle size of about 2.0 microns. Also useful are Super Floss, from World Minerals, a diatomaceous earth of the composition $SiO_2$ 92%, $Al_2O_3$ 44%, $Fe_2O_3$ 1.2%, having an average particle size of about 5.5 microns; and synthetic precipitated silicates such as Sipernat 44, available from Degussa Corporation of Akron Ohio, having a composition of $SiO_2$ 42%, $Al_2O_3$ 36%, $Na_2O$ 22% and having a 3.5 micron mean particle size.

In another embodiment, the particle size of the optional inorganic particles of the antiblocking agent may be from 1 microns to 15 microns, in a second embodiment from 2 microns to 8 microns, and in a third embodiment about 4 microns. The loading of the inorganic particles in the layer C may be from 600 ppm to 5,000 ppm, in a second embodiment from 1,000 ppm to 3,000 ppm, and in a third embodiment from 1,500 ppm to 2,500 ppm.

In one embodiment, the coating can contain a component which readily forms a seal under sealing heat and pressure conditions. Such components can include polyethylene acrylic acid (LTSC) or polyvinylidene chloride (saran), and mixtures thereof.

In another embodiment, the polypropylene of layer B may be the homopolymer Fina 3371 sold by the Fina Oil Company. The polypropylene of layer B may be a homopolymer or a copolymer. Propylene homopolymers for layer B include isotactic polypropylene, in a second embodiment 80–100% isotactic polypropylene, and in a third embodiment about 95% isotactic polypropylene. In another embodiment, the propylene homopolymers may have a melt flow (measured in accordance with the standard ASTM D1238 method) ranging from about 1.2 to about 10 g/10 minutes, and in another embodiment from about 2.5 to about 6 g/10 minutes. Particular propylene copolymers include (98-93)/(2-7) propylene/ethylene copolymers.

In one embodiment, layer A comprises a linear high density polyethylene having a density of greater than 0.940 g/cc, e.g., from about 0.941 to about 0.970 g/cc. It is well known that the density of polyethylene is decreased by copolymerizing ethylene with other olefins, especially those having four or more carbon atoms. Therefore, in another embodiment, it will be understood that the linear high density polyethylenes are free or substantially free of other comonomers. It is also well known that linear high density polyethylenes can be prepared with a variety of coordination-type catalysts.

As described in U.S. Pat. No. 5,929,128 incorporated herein by reference in its entirety, linear high density polyethylene is essentially free of long chain branching.

In another embodiment, layer A comprises a medium density polyethylene having a density of from about 0.926 g/cc to about 0.940 g/cc.

In one embodiment, the polypropylene copolymer of layer C may be a copolymer of propylene with one or more olefins, such as ethylene and $C_4$ to $C_{10}$ alpha-olefins. Such polypropylene copolymers may include at least 80 mole % of propylene.

In another embodiment, the layer C thickness may be from 3 microns to 15 microns, in a second embodiment from 5 microns to 10 microns, and in a third embodiment from 7 microns to 9 microns.

In one embodiment, the coating thickness may be less than 4 microns, in a second embodiment from 0.1 microns to 3 microns, and in a third embodiment from 0.2 micron to 2 microns. In another embodiment, the coating weight is 0.1 to 5.0 gms./msi, in a second embodiment 0.6 to 0.7, or 1.5 to 2.6 gms./msi, and in a third embodiment 0.65 or 2.6 gms./msi.

In another embodiment, the layer B thickness may be from 5 microns to 25 microns, in a second embodiment from 8 microns to 20 microns, and in a third embodiment from 10 microns to 15 microns.

In one embodiment, the layer A thickness may be from 0.5 microns to 15 microns, in a second embodiment from 1 microns to 10 microns, and in a third embodiment from 3 microns to 8 microns.

In another embodiment, the multi-layer film comprising layers A, B, C, and the coating may be uni-axially or bi-axially oriented.

In another embodiment, Layer C and the coating may have a thickness of from about 15% to about 70% of the total thickness of layers A, B, and C, for example, from about 20% to about 60% of this total thickness. The thickness of the layer C may be from about 10% to about 99% of the total thickness of layer C and the coating, for example, from about 40% to about 95% of this total thickness.

The present invention provides a multi-layer film which is hermetically sealable and a method of improving the seal characteristics of multi-layer films which are hermetically sealable in high-speed packaging machines. In order to provide a hermetic seal to packages formed from multi-layer films, care must be taken to provide a sealing medium which accommodates the nature of the barrier film used for the package, i.e., its modulus or stiffness, thickness, adversity to temperature and pressure imposed under sealing conditions, etc. "Hermetic seals" as used herein means both peelable and unpeelable seals which provide hermetic barrier properties, i.e., does not permit passage of a gas.

As pointed out in U.S. Pat. No. 5,888,648, two separate layers may be used to provide a sealing function. Each layer is primarily designed to fulfill one of the required sealing functions, and certain imperfections in hermetic seals normally associated with high-speed film packaging can be avoided. Specifically, the outside layer (layer C) primarily meets the requirement of "compliance" throughout the volume between the surfaces of sealing jaws of high-speed packaging apparatus during the sealing function. Another layer or coating (the coating), on the other hand, primarily meets the requirement of providing high performance adhesion under sealing conditions. Bearing in mind that sealing conditions include both high temperature and pressure imposed on the coating and outside layer, both the outside layer and the coating will participate in both of the sealing functions, i.e., compliance and adhesion. However, the primary function of the outside layer is to provide compliance while the primary responsibility of the coating is to provide adhesivity. Thus, the composition of the outside layer is usually different from the composition of the coating.

Since the primary function of the outside layer is compliance between the sealing jaws, the outside layer should have two attributes to fulfill its function, sufficient thickness and a flow property to comply with the space between the jaws.

"Compliance" in the context of the present disclosure means the ability to be easily and non-elastically deformed to fill and conform to the entire space between the sealing surfaces of a sealing jaw. Sealing jaws can operate from a temperature of from about 120° C. to about 190° C., and normally are imposed on a film packaging material at a pressure of from about 120 psi to about 180 psi.

Sealing jaws are illustrated and described in U.S. Pat. No. 5,888,648. Sealing jaws can be flat, or, in many cases, are provided with teeth. A complementary jaw is used in conjunction with a sealing jaw such that the teeth of the sealing jaw mesh with the valleys the complementary jaw. The surfaces of the jaws close in the sealing position on two multi-layer films, thereby clamping the films therebetween. To form a hermetic seal, the volume between the surfaces must be completely filled during sealing. These are the normal sealing conditions under which the outside layer must be capable of compliance.

The outside layer should have sufficient material to undergo compliance without leaving a void. Thus, the thickness of the outside layer should be such that a continuum of material is provided throughout the space between the surfaces of the sealing jaw. The flow property of the intermediate layer should be such that in the presence of the temperature and pressure exerted during sealing, the material maintains a viscosity which is easily deformed but maintains a non-interrupted mass throughout the space between the sealing surfaces.

In one embodiment, random copolymers of ethylene and propylene or a random terpolymer of ethylene-propylene-butylene (EPB) have been found to be excellent components for the outside layer C. These components are inexpensive and have the correct compliance requirements for layer C. These components can be used alone or in combination with other components, such as linear low density polyethylene.

In another embodiment, the coating has the primary responsibility of providing adhesivity. Thus, the components of the coating should be selected based on their ability to provide good adhesive seal strength, i.e., adequate tensile strength of the seal. Inasmuch as the primary function of the coating is that of adhesivity, the thickness of the coating is less than the thickness of the outside layer C. It has been found that polyethylene acrylic acid (LTSC) and polyvinylidene chloride (saran) are excellent for use as a component in the coating. The coating can optionally include organic and/or inorganic antiblocks to facilitate film machinability. In one embodiment, the coating is an adhesion promoting coating.

DEFINITION OF TERMS 1. 1 gms./msi—A coating thickness of 1 gram per thousand square inches
2. 1 microns—A length of 1 millionth of a meter or 0.0000394 inches
3. Biaxially oriented—stretched in the machine direction, the direction of the feed, and in the transverse direction, perpendicular to the feed
4. Coating—A layer applied to an outside surface of the film
5. Coextruding—A process for producing a multi-layer film where the melted components of each layer are simultaneously fed through a die which stacks the layers on top of each other
6. Comprising—Made up of at least the named components (can also include other unnamed components)
7. Copolymer—An elastomer produced by the simultaneous polymerization of two or more dissimilar monomers, like 90% polyethylene and 10% polypropylene
8. Corona treating—A process involving an electrical discharge that causes the ionization of oxygen and the formation of ozone
9. Crimp seal—A join of two or more layers formed by applying heat and pressure to connect the layers
10. Elevated temperature—A temperature from about 100 to about 300 degrees Fahrenheit, or from about 38 to about 150 degrees Centigrade
11. Film—A thin material from about 10 to about 50 microns thick
12. Fin seal—A join of two or more layers formed by applying heat and pressure to connect the flaps of the layers
13. Flame treatment—A process involving a flame that causes ionization of oxygen
14. Hermetic seal—A seal which does not permit passage of gas (such as air)
15. High density polyethylene—A polyethylene having a density greater than about 0.940 grams per cubic centimeter
16. Lap seal—A join of two or more layers formed by applying heat and pressure to connect the overlap of the layers
17. Machine direction—Substantially parallel to the direction of the process feed
18. Medium density polyethylene—A polyethylene having a density of from about 0.926 to about 0.940 grams per cubic centimeter
19. Metallized—A surface that has a metal coating applied (usually aluminum)
20. Minimum Seal Temperature (MST)—Minimum temperature that will produce a 200 gram seal (ASTM #F-88)
21. Mixture—A heterogenous association of substances that can not be represented by a chemical formula. Its components can usually be separated by mechanical means
22. Orienting film—Stretching film by pulling the ends in opposite directions
23. Plasma Treatment—A process involving a neutral mixture of positively and negatively charged particles interacting with an electromagnetic field
24. Polyethylene—A thermoplastic polymer produced by polymerizing primarily ethylene monomers
25. Polyethylene acrylic acid—A polymer formed from the polymerization of the monomers ethylene and acrylic acid
26. Polyvinylidene chloride—A stereoregular thermoplastic polymer produced by polymerizing vinylidene chloride and optionally with other unsaturated compounds. Also known as "saran"
27. Priming—A process to prepare the outside surface for a coating
28. Reverse direct gravure coating process—A process to apply a coating wherein cells are engraved into a roll surface (gravure roll), and coating is supplied to the rotating gravure roll from a pan, filling the cells and covering the roll surface, the excess is wiped off by a doctor blade. The gravure roll operates in the opposite direction to the web, and the nip is maintained at very light contact by adjustable roll stops. The wiping action blends the dots together, yielding uniform light coatings.
29. Thermoplastic—A high polymer that softens when exposed to heat and returns to its original condition when cooled to room temperature
30. Thickness—a caliper measurement
31. Transverse direction—Substantially perpindicular to the direction of the process feed
32. Uniaxially oriented—stretched in only one direction, either machine, in the direction of the feed, or in the transverse direction, in the direction perpendicular to the feed direction

EXAMPLE 1

The 90 gauge coextruded biaxially oriented film structure comprised a polypropylene core (Fina 3371), with a 25 gauge (6.3 micron) sealant layer of Chisso 7701 terpolymer. This sealant layer contained approximately 3,000 ppm of a non-migratory slip agent. The other skin layer was a metallizeable HDPE layer and treated to improve adhesion of a coating or aluminum to the film.

In a separate coating process, this film as described above, was corona treated on the sealant (Chisso 7701) side, and primed. A polyethylene acrylic acid (LTSC) coating was applied at a coating weight of approximately 0.65 gms./msi. The film was also coated on the HDPE treated side with 0.65 gm/inch of acrylic coating, to improve packaging machineability and to minimize block rolling. The approximate total gauge of the film after coating was 97 gauge.

The resultant biaxially oriented coated film structures had the following sealing properties tested in the Quality Control Lab:

|  | 200 gm/in | Crimp Seal Strengths (20 psi, ¾ sec.)* | | | | | | | |
|---|---|---|---|---|---|---|---|---|---|
| Coating | MST | 140F | 160F | 180F | 200F | 220F | 240F | 260F | 280F |
| No coating | 214F | 0 | 0 | 0 | 0 | 400 | 800 | 900 | 1000 |
| EAA Coating | 145F | 115 | 500 | 650 | 750 | 1050 | 1200 | 1400 | 1500 |

*Note: seal strength values are in gms./in.

The monoweb coated film was evaluated on the Fuji Alpha III HFFS Packaging Equipment at 90 fpm. The hermetic sealing window was determined to be approximately 70 F (from 260 to 330 F). The seal strengths were from 1750 to 3000 gm/in.

The uncoated 90 AIRTYTE** film was evaluated on the Fuji HFFS equipment and this film had poor machineability most likely due to lack of stiffness. There was therefore no hermetic operating window.

EXAMPLE 2

The same 90 gauge AIRTYTE** base film as described in Example #1 was coated. In a separate process, the film was again corona treated on the sealant (Chisso 7701) side, and primed. A Daran 8500 PVdC (saran) coating was applied at a coating weight of approximately 2.6 gms./msi. The film was coated in the same process on the HDPE treated side with 0.65 gms./msi of acrylic coating. The approximate total gauge of the film after coating was 105 gauge.

The resultant biaxially oriented coated film structures had the following sealing properties tested in the Quality Control Lab:

|  | 200 gm/in | Crimp Seal Strengths (20 psi, ¾ sec.)* | | | | | | | |
|---|---|---|---|---|---|---|---|---|---|
| Coating | MST | 140F | 160F | 180F | 200F | 220F | 240F | 260F | 280F |
| No coating | 214F | 15 | 40 | 400 | 1000 | 800 | 700 | 900 | 1000 |
| PVdC Coating | 202F | 125 | 500 | 750 | 1050 | 1350 | 1500 | 1500 | 1600 |

*Note: seal strength values are in gms./in.

The monoweb coated film was evaluated on the Fuji Alpha III HFFS Packaging Equipment at 90 fpm. The hermetic sealing window was determined to be approximately 40 F (from 290 to 330 F). The seal strengths were from 1400 to 2600 gm/in.

The uncoated 90 AIRTYTE** film was evaluated on the Fuji HFFS equipment and this film had poor machineability most likely due to lack of stiffness. There was therefore no hermetic operating window.

EXAMPLE 3

LTSC coated AIRTYTE** shows much lower MST than uncoated

AIRTYTE** when tested on a crimp sealer. However non-coated

AIRTYTE** shows a broader hermetic window on HFFS machine than

AIRTYTE** LTSC coated on the sealant side.

Table #1 summarizes the results 130 ga. AIRTYTE** uncoated on the sealant side (and acrylic coated on the other side (T side) for machineability) showed 80° F. hermetic window and good machinability on Fuji HFFS machine.

125 ga. AIRTYTE** LTSC coated on the sealant side/PVOH coated on the T side showed in the past 40° F. hermetic window on Fuji HFFS machine.

125 ga. AIRTYTE** UHB PVdC coated on the sealant side/acrylic coated on the T side showed in the past 40° F. hermetic window on Fuji HFFS machine.

AIRTYTE** Acrylic coated on the T side showed good machinability on HFFS machine. As a reminder, uncoated Airtyte showed in the past poor machinability on HFFS machine due to jaw sticking.

EXAMPLE 4

Cavitation greatly improved the hermetic window on Fuji HFFS packaging machine.

Table #2 summarizes the results

W.O. LTSC coated AIRTYTE does not show any big difference versus non cavitated LTSC coated AIRTYTE regarding sealing on the crimp sealer.

The hermetic window of W.O. AIRTYTE LTSC coated starts at 190° F. on the Fuji machine. The hermetic window of 90 ga. AIRTYTE LTSC coated started at 270° F.

The hermetic window of W.O. AIRTYTE UHB PVdC coated starts at 250° F. on the Fuji machine. The hermetic window of 90 ga. AIRTYTE UHB PVdC coated started at 290° F.

There hermetic window on Fuji HFFS machine of UHB PVdC or LTSC coated AIRTYTE** were:

90 ga. AIRTYTE**—LTSC coated: starts at 270° F.

90 ga. AIRTYTE**—UHB PVdC coated: starts at 290° F.

125 ga. AIRTYTE**—LTSC coated: starts at 290° F.

125 ga. AIRTYTE**—UHB PVdC coated: starts at 290° F.

Impact of tie layer thickness and sealant skin resin on performance of LTSC and PVdC coated AIRTYTE**.

Only crimp seal results on LTSC coated films are available yet:

15 ga. Ch 7510+5 ga. Ch 7701 gave higher crimp seal strengths than 15 ga. Ch 7510+5 ga. Ch 7510

15 ga. Ch 7510+5 ga. Ch 7701 gave more consistent crimp seal strengths than 30 ga. Ch 7510+5 ga. Ch 7701 ** Note: AIRTYTE films are disclosed in copending U.S. application Ser. No. 09/435,559 incorporated herein by reference in its entirety. An AIRTYTE film is a multi-layer film having an improved composite structure for providing hermetic seals to packages manufactured in high speed packaging apparatus. The structure of the multi-layer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing, and sealing layer D has the primary function of providing adhesivity to the completed seal. The sealing layer D includes an antiblocking agent comprising non-distortable organic polymer particles having an average particle size greater than 6 microns. Comparative Examples 1, 2, 3, and 4 below disclose specific embodiments of the AIRTYTE film:

COMPARITIVE EXAMPLE 1

A laminated film structure is prepared from a four layer coextruded biaxially oriented film having layers A, B, C, and D. Layer A of the four layer film is laminated with adhesive to biaxially oriented polypropylene film product (Mobil's 80 MB400). The four layer film is of the structure A/B/C/D, in which the skin layer A of the film is HDPE about 0.8 $\mu$m thickness, the core layer B of the film is polypropylene about 11 $\mu$m thickness, the intermediate layer C of the film is 9 $\mu$m thickness of ethylene-propylene-butene-1 terpolymer having DSC melting point at 131° C., and the sealable skin layer D of the film is 1 $\mu$m thickness of ethylene-propylene-butene-1 terpolymer having DSC melting point at 126° C. loaded with 2400 ppm $SiO_2$ about 4 microns size and 6000 ppm Epostar 1010, available from Nippon Shokubai Co., Ltd., which is a cross-linked copolymer of methylmethacrylate and propylidene trimethacrylate with average particle size about 10 microns.

The laminated film is evaluated by using a vertical form fill and seal machine, Fuji FW7700, at the speed of 55 packages per minute. Empty bags at the size 5"×7-½" filled with air are sealed at the specified temperatures for fin seal at the back of the bag and crimp seal on both ends of the bag. The bags are put under water vacuum at 10 inches mercury. If there are no bubbles observed, the seal is considered hermetic seal or no leak. From crimp seal and fin seal temperatures combination, the data are generated to obtain the hermetic seal range (i.e. There is no leak in these temperature range). Hermetic seal range for the above laminated structure is observed when fin seal temperature is from 260° F. to 280° F. and crimp seal temperature is from 260° F. to 290° F.

COMPARITIVE EXAMPLE 2

A laminated film structure is prepared from four layer coextruded biaxially oriented film having layers A, B, C, and D. Layer A of the four layer film is laminated with polyethylene to an oriented polypropylene film (Mobil's 80MB400). The four layer coextruded biaxially oriented film is the same structure as Example 1. The laminate is run through the same packaging machine and same speed as Example 1. Hermetic seal range for the laminate is observed when fin seal temperature is from 250° F. to 290° F. and crimp seal temperature is from 260° F. to 290° F.

COMPARITIVE EXAMPLE 3

A laminated film structure is prepared from four layer coextruded biaxially oriented film having layers A, B, C, and D. Layer A of the four layer film is laminated with polyethylene to an oriented polypropylene film (Mobil's 70 SPW-L). The four layer coextruded biaxially oriented film is the same structure as Example 1. The laminated film is evaluated by using a vertical foam fill and seal machine, Hayssen Ultimum II, at the speed 55 packages per minute. Empty bags at the size 5"×7-½" filled with air are sealed at the specified temperatures for lap seal at the back of the bag and crimp seal on both ends of the bag. Hermetic seal range is observed when lap seal temperatures is from 260° F. to 330° F. and crimp seal temperature at 310° F., and lap seal temperature is from 280° F. to 330° F. and crimp seal temperature at 300° F.

COMPARITIVE EXAMPLE 4

A metallized four layer coextruded biaxially oriented film is evaluated. The aluminum vacuum deposition is applied on the skin layer A of the structure A/B/C/D which is the same four layer coextruded biaxially oriented film structure as Example 1. This metallized film is further printed with ink on the top of aluminum layer and a heat resistance lacquer layer is coated on the top of the ink. The final layer structure is (heat resistance lacquer)//ink//(vacuum metallized aluminum)//HDPE//Polypropylene//EPB-terpolymer (I)//EPB-terpolymer (II), where EPB-terpolymer (I) is 9 um thickness of ethylene-propylene-butene-1terpolymer having DSC melting point at 131° C., and EPB-terpolymer(II) is 1 um thickness of ethylene-propylene-butene-1 terpolymer having DSC melting point at 126° C. loaded with 2400 ppm $SiO_2$ about 4 microns size and 6000 ppm Epostar 1010, available from Nippon Shokubai Co., Ltd., which is a cross-linked copolymer of methylmethacrylate and propylidene trimethacrylate with average particle size about 10 microns. This over-lacquered, printed, and metallized film is run through horizontal form fill and seal machine, Doboy, at the speed 86 feet per minute or 172 packages per minute. Empty bags filled with air are generated. The hermetic seal range evaluation procedure is the same as Example 1. A hermetic seal range is observed when the crimp seal temperature is from 240° F. to 320° F. and fin wheel temperature is set at 320° F.

What is claimed is:

1. A thermoplastic multi-layer film for forming hermetic seals on packages comprising:
   (a) a core layer comprising polypropylene;
   (b) an outer layer comprising a copolymer having a thickness of 5 microns to 10 microns;
   (c) an adhesion promoting coating applied to outer layer.

(d) at least one additional layer comprising polyethylene; and (e) wherein the total thickness of the outer layer and the adhesion promoting coating is from about 15% to about 70% of the total thickness of the core layer, the outer layer, and the at least one additional layer, wherein the outer layer and the adhesion promoting coating provide the sealing function.

2. The film of claim 1, wherein the copolymer of the outer layer is selected from the group consisting of ethylene-propylene copolymer, ethylene-propylene-butene-1 terpolymer, propylene-butene copolymer, and mixtures thereof.

3. The film of claim 1, wherein the thickness of the film is from about 17 microns to about 63 microns.

4. The film of claim 3, wherein the film is biaxially oriented.

5. The film of claim 1, wherein the core layer thickness is from about 10 microns to about 50 microns; and at least one additional layer thickness is from about 0.5 microns to about 3 microns.

6. The film of claim 1, wherein the film is uniaxially oriented.

7. The film of claim 1, wherein the film is hermetically sealable in a machine for making packaging bags with a combination of a fin seal and crimp seals or a combination of a lap seal and crimp seals.

8. The film of claim 1, wherein the at least one additional layer is metallized.

9. The film of claim 1, wherein the adhesion promoting coating comprises a polyethylene acrylic acid.

10. The film of claim 9, wherein the adhesion promoting coating has a weight from about 0.6 gms./msi to about 0.7 gms./msi.

11. The film of claim 1, wherein the adhesion promoting coating comprises a polyvinylidene chloride.

12. The film of claim 11, wherein the adhesion promoting coating has a weight from about 1.5 gms./msi to about 2.6 gms./msi.

13. The film of claim 1, wherein the at least one additional layer comprises high density polyethylene.

14. The film of claim 1, wherein the at least one additional layer comprises medium density polyethylene.

15. The film of claim 1 further comprising a coating applied to the at least one additional layer.

16. The film of claim 15 wherein the coating applied to the at least one additional layer is an acrylic coating.

17. The film of claim 1 wherein the film has a MST below 170 degrees fahrenheit.

18. The film of claim 1 wherein the total thickness of the outer layer and the adhesion promoting coating is from about 20% to about 60% of the total thickness of the core layer, the outer layer, and the at least one additional layer.

19. A method of producing the thermoplastic multi-layer film as claimed in claim 1, said method comprising the steps of:

(a) coextruding a first layer comprising polyethylene; said core layer comprising polypropylene; and said outer layer comprising a copolymer; and (b) coating said outer layer, wherein said coating comprises the adhesion promoting coating.

20. The method of claim 19 further comprising the step of orienting said film in the machine direction at an elevated temperature.

21. The method of claim 20 further comprising the step of orienting said film in the transverse direction at an elevated temperature.

22. The method of claim 19 further comprising the step of coating said at least one additional layer wherein said coating comprises an acrylic coating.

23. The method of claim 19 further comprising the step of corona treating said outer layer.

24. The method of claim 19 further comprising the step of flame treating said outer layer.

25. The method of claim 19 further comprising the step of plasma treating said outer layer.

26. The method of claim 19 wherein the coating step is a reverse direct gravure coating process.

27. The method of claim 19 wherein the film produced has a MST below 170 degrees fahrenheit.

28. A thermoplastic multi-layer film for forming hermetic seals on packages comprising:

(a) a first layer comprising polyethylene having a first side and a second side;

(b) a core layer comprising polypropylene having a first side and a second side, wherein the first side of the core layer is adjacent to the second side of the first layer;

(c) an outer layer comprising a copolymer having a first side and a second side and wherein the outer layer has a thickness of 5 microns to 10 microns, wherein the first side of the outer layer adjacent to the second side of the core layer; and (d) an adhesion promoting coating applied to the second side of the outer layer, wherein the outer layer and the adhesion promoting coating provide the sealing function.

\* \* \* \* \*